United States Patent [19]
Johnston et al.

[11] Patent Number: 5,517,581
[45] Date of Patent: May 14, 1996

[54] PERCEPTUALLY-ADAPTED IMAGE CODING SYSTEM

[75] Inventors: James D. Johnston, Warren; Robert J. Safranek, New Providence, both of N.J.

[73] Assignee: AT&T Corp., Murray Hill, N.J.

[21] Appl. No.: 417,501

[22] Filed: Apr. 5, 1995

Related U.S. Application Data

[63] Continuation of Ser. No. 161,695, Dec. 3, 1993, abandoned, which is a continuation of Ser. No. 98,561, Jul. 26, 1993, abandoned, which is a continuation of Ser. No. 964,576, Oct. 21, 1992, abandoned, which is a continuation of Ser. No. 850,147, Mar. 12, 1992, abandoned, which is a continuation of Ser. No. 350,435, May 4, 1989, abandoned.

[51] Int. Cl.$^6$ .................................................. G06K 9/36
[52] U.S. Cl. ........................ 382/232; 382/239; 382/254
[58] Field of Search .................................. 382/232, 238, 382/239, 254

[56] References Cited

U.S. PATENT DOCUMENTS

| | | | |
|---|---|---|---|
| 4,048,443 | 9/1977 | Crochiere et al. | 381/47 |
| 4,405,920 | 9/1983 | Weisstein | 348/25 |
| 4,500,911 | 2/1985 | Ninomiya et al. | 358/36 |
| 4,580,162 | 4/1986 | Mori | 358/135 |
| 4,969,040 | 11/1990 | Gharavi | 358/136 |
| 4,987,480 | 1/1991 | Lippman et al. | 358/13 |
| 5,109,451 | 4/1992 | Aono et al. | 382/56 |
| 5,309,526 | 5/1994 | Pappas et al. | 382/56 |

OTHER PUBLICATIONS

W. H. Chen and C. H. Smith, "Adaptive Coding of Monochrome and Color Images", *IEEE Trans. Comm.*, vol. COM–25, pp. 1285–1292, Nov. 1987.

J. W. Woods and S. D. O'Neil, "Sub–Band Coding of Images", *IEEE ASSP*, vol. 34, No. 5, Oct. 1986, pp. 1278–1288.

H. Charavi and A. Tabatabai "Sub–Band Coding of Digital Images Using Two–Dimensional Quadrature Mirror Filtering", *Proc. SPIE*, vol. 707, pp. 51–61, Sep. 1986.

P. H. Westerink, J. W. Woods and D. E. Boekee, *Proc. of Seventh Benelux Information Theory Symposium*, pp. 143–150, 1986.

King N. Ngan et al, "Cosine Transform Coding Incorporating Human Visual System Model", *SPIE vol. 707, Visual Communications and Image Processing*, (1986), pp. 165–171.

R. V. Cox, "The Design of Uniformly and Nonuniformly Spaced Pseudo Quadrature Mirror Filters", *IEEE Trans. ASSP.* vol. ASSP–34, No. 5, Oct. 1986, pp. 1090–1096.

*Primary Examiner*—Jose L. Couso
*Attorney, Agent, or Firm*—David M. Rosenblatt

[57] ABSTRACT

An image-coding system reduces image data redundancies and perceptual irrelevancies through progressive sub-band coding. The image is separated into a plurality of sub-bands. From this sub-band information, a perceptual metric, based on the properties of the sub-band filters, quantizer error distribution, and properties of the human visual system, is determined which provides the maximum amount of coding noise that may be introduced to each pixel in every sub-band without causing perceptible degradation of the coded image. This perceptual metric is used to adjust the quantizer used in encoding each sub-band signal. In addition, redundancy in the output of the quantizer is reduced using a multidimensional Huffman compression scheme.

15 Claims, 6 Drawing Sheets

| BANDS | 0 | 1 | 2 | 3 |
|---|---|---|---|---|
| 0 | 0.25 | 0.4 | 2.0 | 6.0 |
| 1 | 0.5 | 1.0 | 4.0 | 8.0 |
| 2 | 2.0 | 3.0 | 6.0 | 9.0 |
| 3 | 3.0 | 6.0 | 10.0 | 11.0 |

PERCEPTUALLY-ADAPTED IMAGE CODING SYSTEM

This application is a continuation of application Ser. No. 08/161,695, filed on Dec. 3, 1993, now abandoned which is a continuation of application Ser. No. 08/098,561 filed on Jul. 26, 1993, now abandoned, which is a continuation of application Ser. No. 07/964,576 filed on Oct. 21, 1992, now abandoned, which is a continuation of application Ser. No. 07/850,147 filed on Mar. 12, 1992, now abandoned, which is a continuation of application Ser. No. 07/350,435 filed on May 4, 1989, now abandoned and claims priority thereto.

BACKGROUND OF THE INVENTION

This invention relates to image processing and more particularly to encoding of images for the efficient transmission and/or storage of high quality image information.

The demand for electronic services related to pictorial images or other two-dimensional data has grown so rapidly that even the accelerating advance of electronic transmission and storage technologies will not be able to keep pace, unless the electronic data derived from the images can be compressed in a way that does not impair perception of the reconstructed image or other two-dimensional data.

Different compression methods have evolved in the art as understanding of pictorial data has increased and theoretical advances have been made. Differential Pulse Code Modulation (DPCM) and bit-plane coding were among the early methods used, and they achieved compression factors of up to 4–6 by trading image quality for lower bit rate. Pictures with higher quality than obtainable with DPCM, coded with only one bit per pixel, can now be obtained with a number of methods, such as the Adaptive Discrete Cosine Transform (ADCT) described by W. H. Chen and C. H. Smith, in "Adaptive Coding of Monochrome and Color Images", *IEEE Trans. Comm.*, Vol. COM-25, pp. 1285–1292, November 1987. In an ADCT coding system, the image is decomposed into blocks, generally eight by eight, and for each of the blocks a DCT (Discrete Cosine Transform) is carded out. The compression is obtained by quantization of the DCT coefficients with variable thresholds, partially optimized for the human visual acumen, followed by variable word length encoding.

Sub-band coding of images has been introduced to picture coding. One arrangement was proposed by J. W. Woods and S. D. O'Neil, in "Sub-Band Coding of Images", *IEEE ASSP*, Vol. 34 No. 5, October 1986, pp. 1278–1288. The arrangement proposed by Woods et al includes a filter bank, that divides the image signal into bands of different frequency content, and the signal of each filter output is compressed via DPCM. The compressed signals are then transmitted to a receiver where the process is reversed. Specifically, each signal is DPCM decoded and then up-sampled, filtered, and combined with the other filtered signals to recover the original image.

H. Gharavi and A. Tabatabai in "Sub-Band Coding of Images Using Two-Dimensional Quadrature Mirror Filtering," *Proc. SPIE*, Vol. 707, pp. 51–61, September 1986, use long complex quadrature mirror filters to obtain a number of frequency band signals. The "low-low" band is DPCM coded using a two-dimensional DPCM codec. A dead-zone quantizer is used for the other bands, followed by PCM coding.

Other sub-band coding schemes such as proposed by P. H. Westerink, J. W. Woods and D. E. Boekee in *Proc. of Seventh Benelux Information Theory Symposium*, pp. 143–150, 1986, apply vector-quantization techniques to code the filter bank outputs.

In the copending patent application of H. Bheda and A. Ligtenberg, Ser. No. 222,987, filed Jul. 22, 1988, and assigned to the assignee hereof, the data redundancies in the different sub-band signals are employed to achieve additional data compression. In fact, that technique provides an excellent "front end" for image processing based on sub-band analysis techniques.

There remains the problem of quantizing the analyzed information more effectively in terms of bits per pixel and perceived quality of a reconstructed image. We have determined that the existing versions of the Discrete Cosine Transform do not take full advantage of all facets of the known properties of human visual perception.

Some recent work has addressed this problem. See the article by King N. Ngan et al, "Cosine Transform Coding Incorporating Human Visual System Model," *SPIE Vol. 707, Visual Communications and Image Processing* (1986), pp. 165–171, particularly addressing contrast sensitivity. The contrast sensitivity is applied to the quantization process in a very restricted fashion; and other relevant parameters are not applied. Indeed, a kind of pre-emphasis is applied before quantization, apparently in preference to a more precise degree of control over the quantization process.

SUMMARY OF THE INVENTION

According to our invention, a sub-band analysis method for electronic image processing includes determining the amount of quantizing noise which would be just imperceptible in respect to one or more of the parameters of frequency, contrast and texture, and adapting the quantization of each pixel in response to such one or more parameters so that the amount of quantizing noise is relatively near, but below, the limit of perceptibility. By thus allowing the amount of quantizing noise to rise when it is imperceptible, we are able to achieve unprecedented data compression of a transmitted or stored image without perceptible degradation in the reconstruction thereof.

BRIEF DESCRIPTION OF THE DRAWINGS

Other features and advantages of our invention will become apparent from the following detailed description, taken together with the drawing, in which.

DETAILED DESCRIPTION

Figure 1:
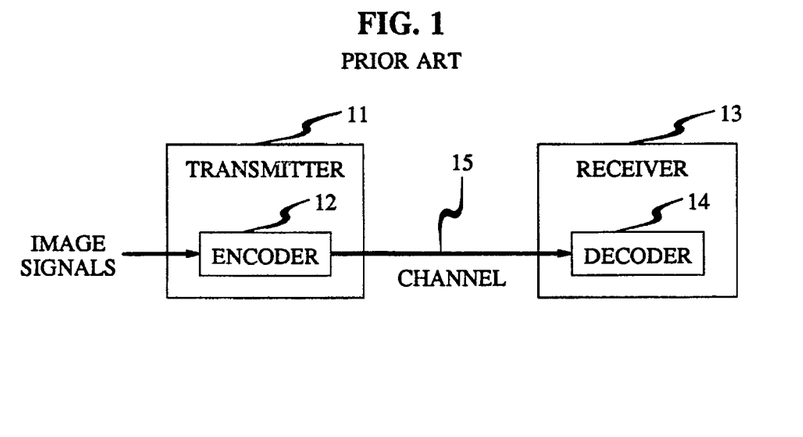
FIG. 1 is a block-diagrammatic showing of a generic organization of of an image coding technique of the type to which our invention is directed.

FIG. 1 illustrates the basic communication system for practicing our invention. It includes a transmitter 11 including an encoder 12 connected, via a transmission channel 15, to a receiver 13 including a decoder 14. Transmission channel 15 should be considered in its broadest sense to include a storage medium, such as a compact disk read-only memory (CD ROM) or digital tape medium. That is, rather than sending encoded signals to a receiver in "real time," one can store the signals in such a "channel" and reproduce them at a latter time upon request. This concept encompasses, of course, situations that are not usually thought of as communicating, the channel or "medium" being a purchased recording and the transmitter and receiver serving recording and reproduction functions of interest to a consumer, even for use in his home. Another application includes archival of major collections of photographs, as in geological surveying. The "channel" 15 is then the archive.

Figure 2:
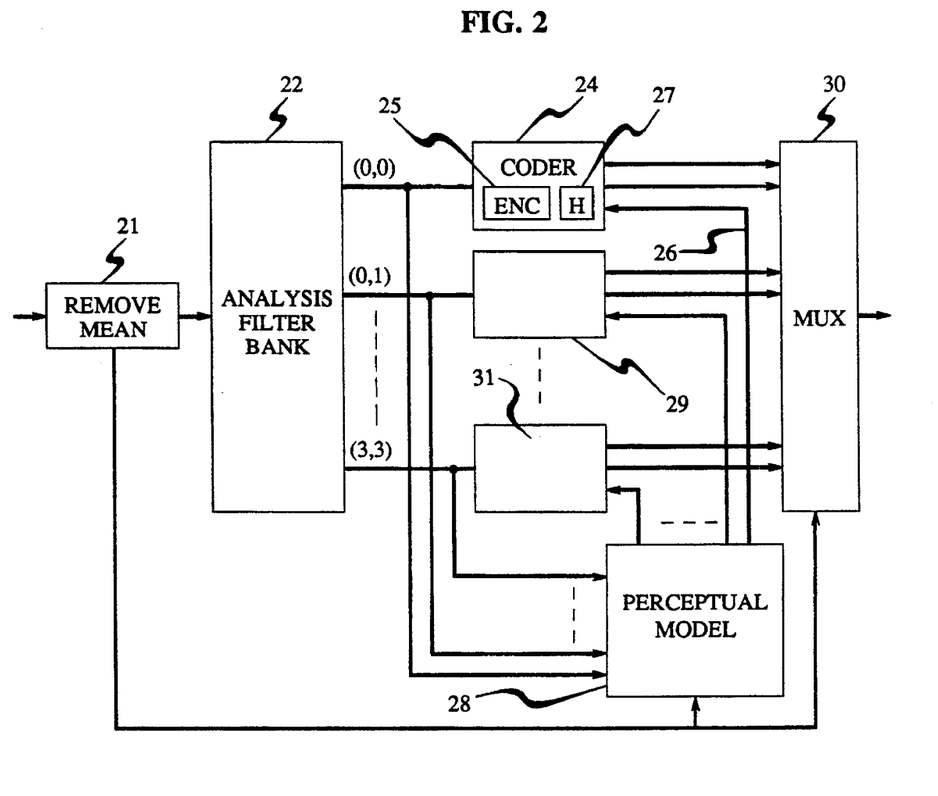
FIG. 2 depicts a block diagram of encoder 12 of FIG. 1, adapted according to our invention.

FIG. 2 depicts a block diagram of encoder 12. It includes an analysis filter bank 22 to which the image signal is applied. The image signal can have any number of formats, and the standard raster format for two dimensional images is an acceptable one. For digital filtering, the signal already has been pre-sampled (by means not shown). In addition, the signal mean value has been removed by processor 21. It is quantized to 8 bits and presented to the Perceptual Model (28) and the multiplexer (30). In FIG. 2, filter bank 22 has 16 outputs, from (0, 0) to (3, 3), but it is understood that this can be any number greater than 1. These correspond to the 16 possible signals of an image that was filtered into a high band and a low band and two intermediate bands in both the horizontal dimension and the vertical dimension. The respective four bands of developed image data in the horizontal dimension, for example, are then passed through the corresponding "vertical filters". The reorganization of the data implied here is simply done when the data is in the sampled data format. For most scenic images, as contrasted with images comprising merely lines, the lowest band image (low pass filtered both horizontally and vertically) contains the bulk of the relevant visual information, while the other bands contain detail information.

Utilizing the above, FIG. 2 includes a coder 24 that is responsive to the lowest band (0,0) image for both directions. The quantizer-encoder apparatus 25 in coder 24 responds to the human visual system adaptation signal on lead 26 to render the quantizing and encoding process responsive to the perceptual analysis occurring in perceptual model 28. In coder 24, the quantizer-encoder 25 is followed by a Huffman encoder 27 to prepare the signal for multiplexer 30. One of the inputs to model 28 is derived from processor 21 in order to provide one datum for each pixel related to contrast and brightness.

The other inputs to perceptual model 28 are exactly the inputs to coder 24 and the other 15 similar coders.

The other coders responding to other frequency bands, e.g., coder 29 and coder 31, are organized similarly to the organization of coder 24.

In our system, as contrasted to that of the above-cited copending patent application of Bheda et al, the compression of the data achieved, for example, in coder 24, is a direct consequence of the principles of our invention, which will now be described.

Figure 3:
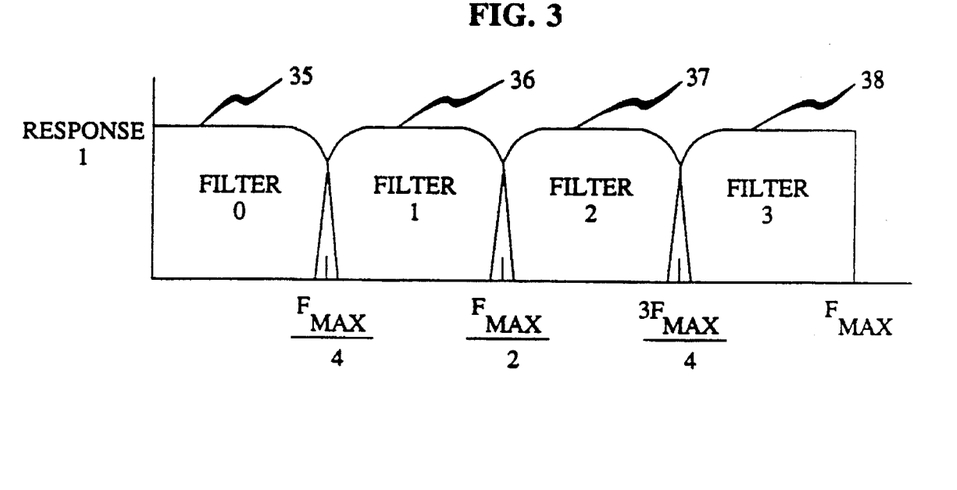
FIG. 3 shows curves of the characteristics of filters usable for each stage of filtering in the analysis filter bank of FIG. 2.

One possible implementation of the filter bank (22) would utilize an equal bandwith filterbank using separable Generalized Quadrature Mirror Filters (GQMF), as described in the article by R. V. Cox, "The design of uniformly and nonuniformly spaced pseudo quadrature mirror filters", *IEEE Trans. ASSP*, Vol. ASSP-34, No. 5, October 1986, pp. 1090–1096. A separable two dimensional filter consists of two one dimensional filters applied in orthogonal directions. In our case, a GQMF filter is applied first to the rows of an image, providing horizontal filtering as illustrated by filters 40–43 of FIG. 4, then the same filter is applied to the columns of the horizontally filtered images to provide the vertical filtering. Typical filter characteristics are shown in curves 35–38 of FIG. 3.

Figure 4:
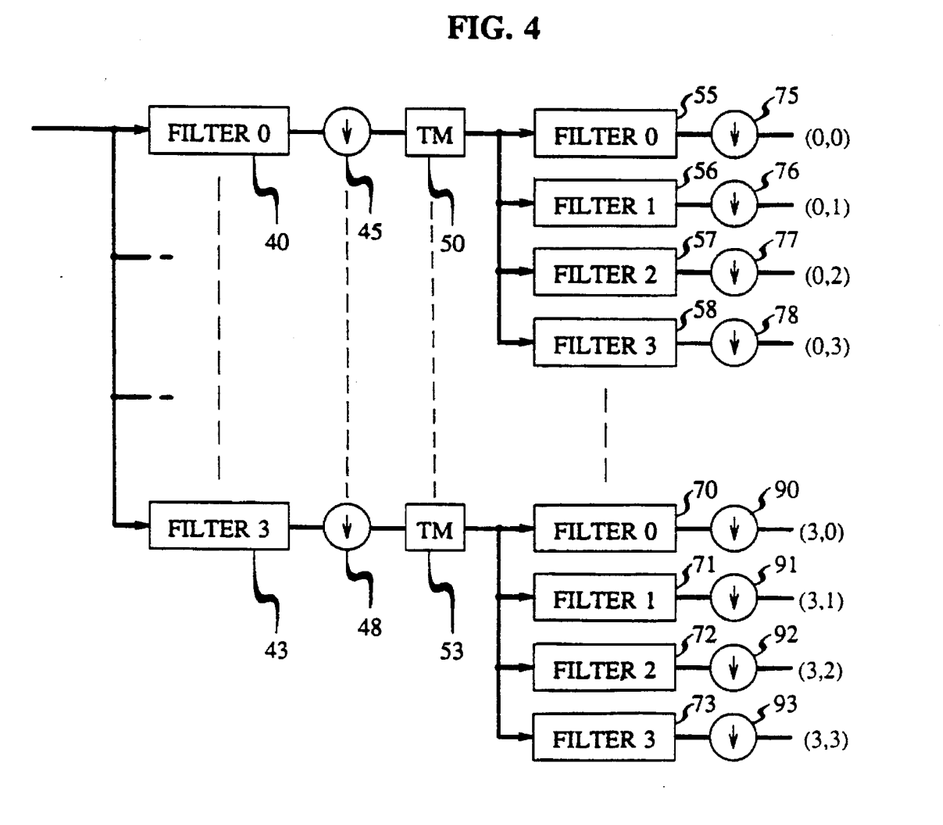
FIG. 4 is a block diagrammatic illustration of the organization of the analysis filter bank of FIG. 2.

Referring now to FIG. 4, the output of filters 40–43 can be down-sampled (sometimes called "subsampled"); and, to that end, down-sampling switches 45–48 are to be responsive to filters 40–43, respectively. Down-sampling can be accomplished, for example, by ignoring three out of every four samples (while, on the other hand, up-sampling would be accomplished by repeating a given sample). The outputs of down-sampling switches 45–48 are applied to transpose memories 50–53, respectively, that transpose the pixel signals of the two-dimensional image in the manner of transposing matrices. Transpose memories 50–53 are conventional memories in which signals are stored in one way (following rows) but accessed in a different way (following columns). Such memory arrangements are well known in the art. For the sake of completeness, however, the following simple implementation is suggested. To obtain transposition, one may use an address counter and a memory responsive thereto, with a logic circuit interposed therebetween. The logic circuit allows for interchange of a number of least significant bits of of the counter with higher significant bits of the counter. A normal sequence is thus obtained without the interchange of bits; and the transposed sequence is obtained by interchanging the bits.

The output of transpose memory 50 is applied to filters 55–58, and similarly the outputs of transpose memories 51–53 are respectively applied to sets of filters 60–63, 65–68, (not shown) and 70–73. These sets of filters, for example, 55–58, are exactly like filters 40–43, in the same order and, in fact, may be implemented on a time-shared basis by the same set of digital filters. The outputs of filters 55–73 are applied to down-sampling switches 75–93, respectively (each numbered 20 digits higher than its corresponding filter), which produces the outputs of analysis filter bank 22. The GQMF filters we used split both the horizontal and vertical dimensions into four equal width bands. This number of bands provides a convenient tradeoff between spatial and frequency localization, as fewer bands would provide too coarse frequency analysis, while more bands would blur spatial localization.

The lowest frequency in both dimensions is in sub-band (0,0), while the highest frequencies in both dimensions are in band (3,3). The GQMF filter that was used in our system has a first sidelobe suppression of >48 dB, which ensures perfect reconstruction of an 8 bit/pixel image.

Referring again to FIG. 2, the perceptual masking model (28) provides an estimate of the amount of coding distortion that may be added to each pixel in each sub-band signal so that there will be no discernible difference between the original image and the coded version. This model utilizes several well known properties of the human visual system (HVS) in unique ways. The properties we use are: frequency response; contrast sensitivity; and texture masking. This model is not meant to be a complete description of the HVS, but it provides an approximation of the effects major HVS properties have on the perception of an image given a particular analysis/synthesis procedure.

Figure 5:
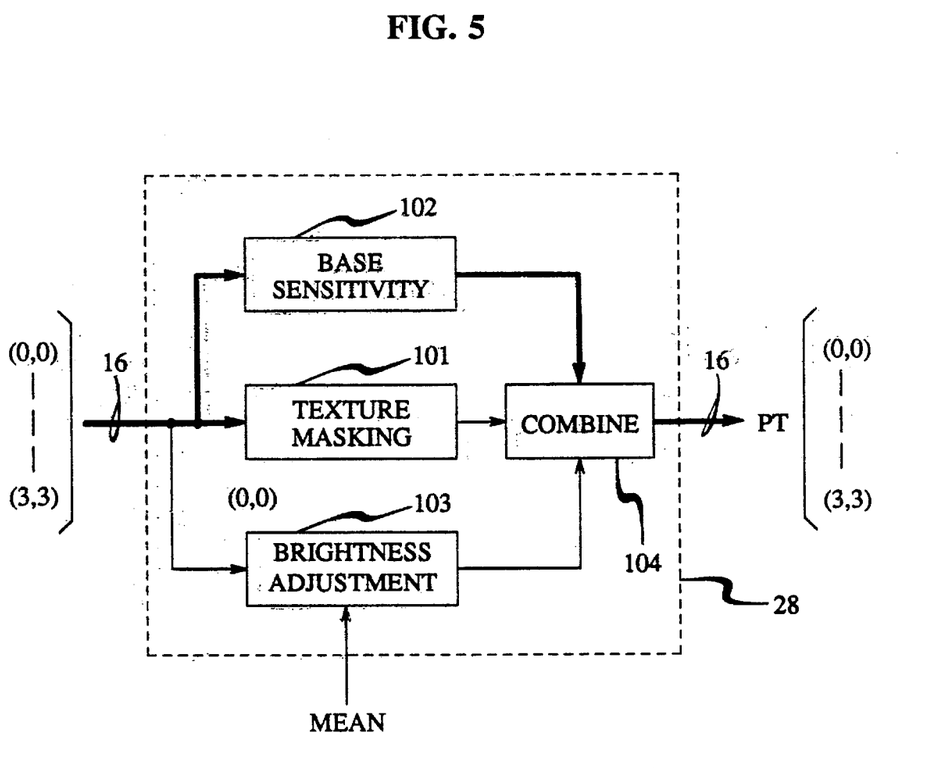
FIG. 5 depicts the signal flow in the perceptual modeling according to our invention.

Turning now to FIG. 5, the frequency response component (102) in perceptual model 28 provides the maximum amount of distortion that can be added to each of the sub-band signals given a mid-grey flat-field image as input. The HVS is most sensitive to noise is this type of stimulus. The other components of the model adjust this distortion estimate for deviations in the image's brightness from mid-grey (block 103), and for its deviations from flat-field (block 101 ). These estimates are then combined (block 104), and presented as input to each of the sub-band encoders (24).

Figure 8:
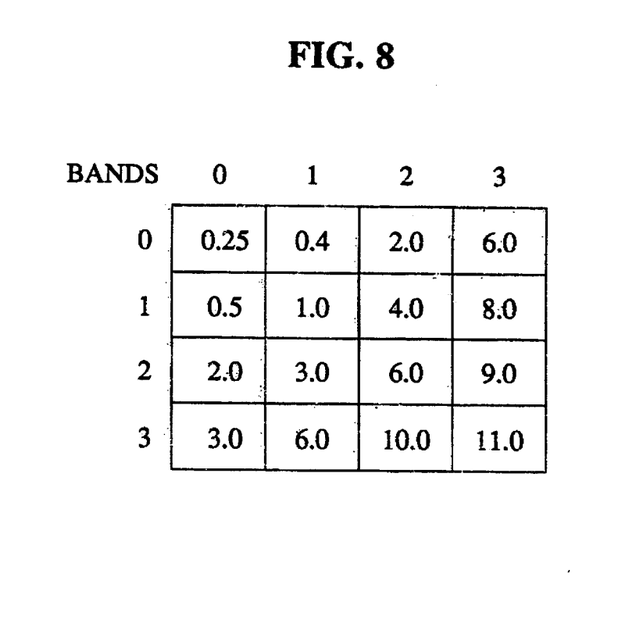
FIG. 8 shows a table useful in explaining the invention.

The base sensitivity estimates were derived from a set of psychophysical experiments. A uniform mid-grey image was presented to the analysis filter bank (22). For one of the resulting sub-band signals, say (0,0), white, uniform random noise was added. This distorted signal, along with the other 15 undistorted signals were presented to the reconstruction filter bank (150). This distorted image, and the original were viewed side by side in a darkened room at a viewing distance of 6 times image height. The variance of the added white noise was adjusted to find the maximum value for which a human observer could perceive no difference between the original and distorted images. This process was then repeated for each sub-band signal in turn. Typical RMS noise sensitivity values for this experiment are presented in FIG. 8. These values were experimentally derived and are dependent on the particular filters used in the analysis filter bank, and the viewing distance, therefore some variation in these values should be expected.

Figure 9:
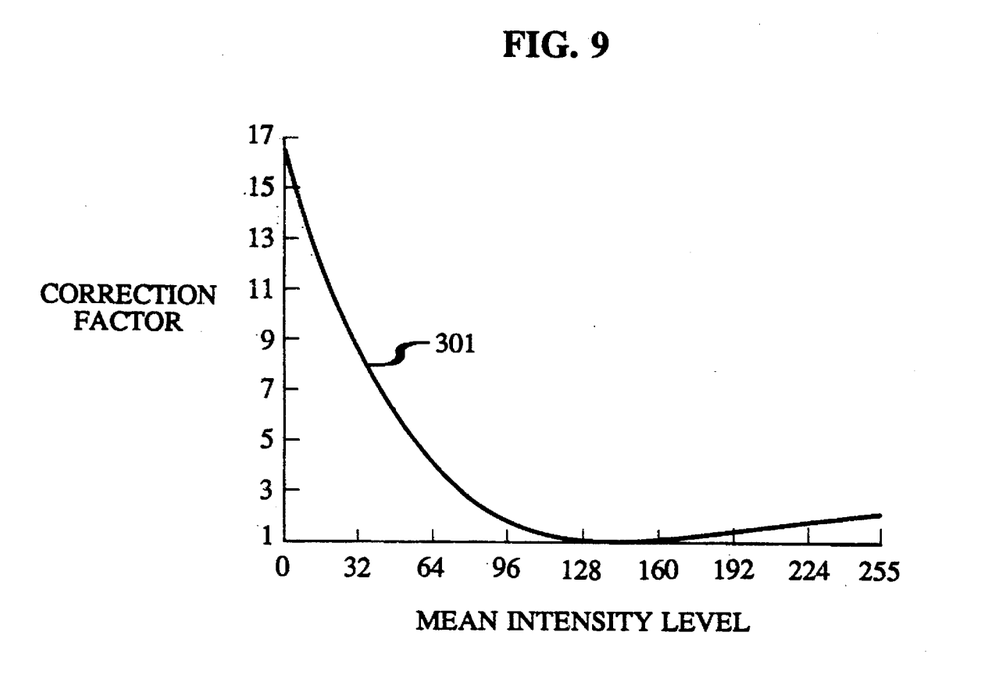
FIG. 9 shows a curve useful in explaining the invention.

These values provide the allowable coding distortion for one particular stimulus, namely a mid-grey flat field. The brightness adjustment term is used to generalize this model to flat-field stimuli with varying brightness. The previous experiment was repeated for sub-band (0,0), but the grey level of the flat field input was now varied from pure back to pure white. Again, the maximum amount of white noise that could be added to the stimulus was determined. The resulting deviations from the sensitivity values for mid-gray flat field are shown in FIG. 9. The correction factor is applied by computing the local image mean, looking up the value of the correction factor in FIG. 9, and multiplying the base sensitivity for the sub-band by that value. For the conditions of the base sensitivity experiment (grey level of 127), it provides no adjustment, but for higher and lower grey levels, it allows for substantially more coding distortion. A full implementation of this correction term would repeat this series of experiments for each sub-band, resulting in 16 correction curves. However, it was determined that the shape of this curve is essentially constant across relevant sub-bands, so an efficient implementation uses this one curve for every subband.

The final component of the perceptual metric provides an adjustment for the decreased noise visibility given non-flat-field inputs, i.e. texture. Flat-field stimuli have only DC frequency components, while textured input has both DC and AC components. The noise visibility for the DC component is accounted for by the base sensitivity and brightness adjustment terms, while the texture masking term (101) handles the AC terms. This texture masking term consists of a weighted sum of the AC portion of the energy in each subband. Since the HVS has a non-uniform transfer function, the energy in each subband is weighted by the relative visibility of the frequencies contained in each subband.

In practice, a value for the perceptual metric is determined at every point in every sub-band. One possible implementation could use table lookup indexed by sub-band number to determine the base sensitivities, and table lookup indexed by the sum of the overall image mean and the local value from each point in sub-band (0,0) to determine the Brightness Adjustment. The texture masking term could be computed by taking the variance over a 2×2 pixel block in sub-band (0,0) (This computes the AC energy in the lowest frequency sub-band) weighted by the average HVS response in band (0,0). For each of the other sub-bands, added to this term would be the average energy over a 2×2 pixel block weighted by the average HVS response for that sub-band. This composite term would then be raised to the power 0.065. This number was set to ensure that highly textured images would be transparently coded. Each of these terms are input to the combination block (104) where they are multiplied together to produce the final value for the perceptual metric. This procedure will provide a metric that will produce visually transparent coding. If some perceptible distortion is allowable, this metric could be relaxed multiplying it by a constant >1.0.

Figure 6:
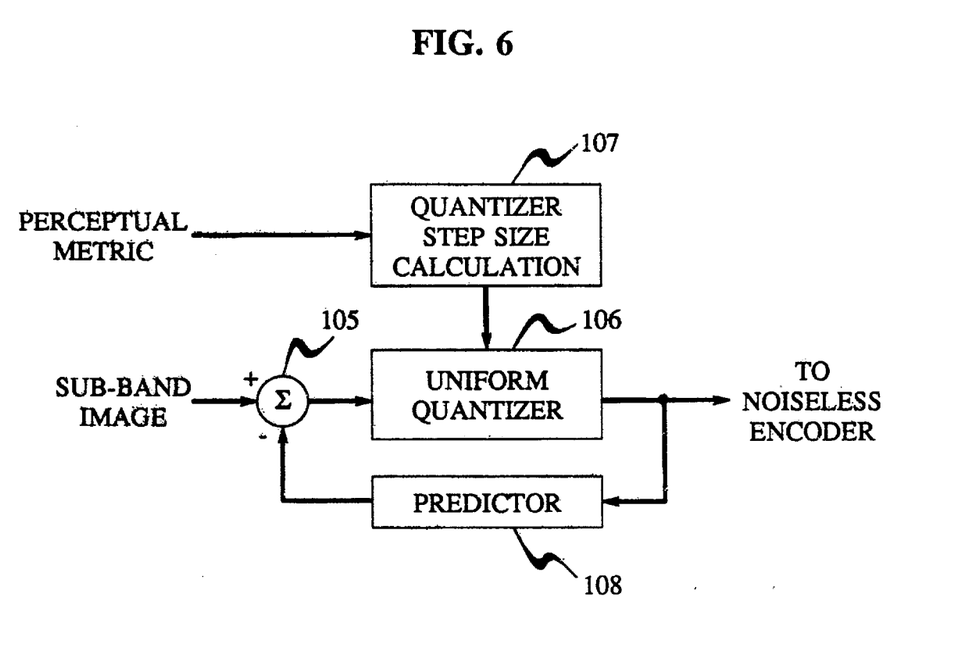
FIG. 6 is a block diagrammatic showing of the encoder 25 of FIG. 2.

The perceptual metric is then used to control a DPCM encoder (25) (FIG. 2) for each sub-band. DPCM coding is well known in the prior art. The predictor block (108) uses a three point predictor utilizing the previous point, previous row, and back diagonal, is used. The optimal predictor coefficients are computed for each sub-band and quantized to 5 bit accuracy. If a portion of the sub-band is coded, these coefficients are sent as side information to the decoder.

A uniform quantizer is used (106). Its step size is determined by the perceptual metric function (28 in FIG. 2). If the absolute value of the difference between the original and coded signals is less than the value of the metric, the coded image will be visually indistinguishable from the original. One means of satisfying this condition is to set the quanfizer step size to twice the minimum value of the perceptual metric over a sub-band in quantizer stepsize calculator 107. This step size is quantized to 16 bit accuracy and sent as side information to the decoder. The summation function 105 operates on the sub-band image signal and the output of predictor 108 to provide the input to the uniform quantizer 107. The output of the quantizer, hereafter called code words, denoted $c(x,y,i,j)$ where x and y are the spacial location within a sub-band, and i and j are the sub-band number, are passed to the Huffman encoder (27).

Noiseless Compression

First, inside of each sub-band, the codewords $c(x,y,i,j)$, are partitioned into 4×4 partitions. For the purpose of discussing the noiseless compression, we will assume that the original image is 512×512 pixels, ergo each sub-band is 128×128. There are 32×32 partitions, each containing 4×4 codewords, in the 128×128 sub-band image. The number 512×512 is chosen for the purpose of illustration, other sizes of original and/or sub-band image may be compressed via this compression algorithm. Since the noiseless compression works identically in each sub-band, the notation indicating sub-band, i,j will usually be omitted. The variables used in this section will be k,l, $0 \leq k,l < 32$, which are the indices for the partitions. First, for each partition, the largest absolute value, LAV, contained in each partition is calculated, i.e. $LAV(k,l) = \max(abs(c(x,y,i,j)))$, $4k \leq x < 4(k+1)$, $1 \leq y < 4(l+1)$, where c(*) is the DPCM codewords for the proper sub-band from the process above.

After the LAV(*) are calculated, the number of non-zero LAV(k,l) are counted. If there are no non-zero LAV's, the sub-band has no coded data to send, and a zero bit is sent, indicating that "this band is not coded". If there are non-zero LAV's, a "1" bit is sent. If there are non-zero LAV's, but fewer than roughly 150, the k,l addresses of each are sent, at a cost of 5 bits per k or l, along with a 9 bit count indicating how many coded partitions there are. These k,l pairs are used to indicate which blocks will have their c(*) encoded. If there are a large number of non-zero partitions, a "Dimensionality Map" is calculated and sent for the entire sub-band.

Calculating the Dimensionality Code

Regardless of the number of non-zero partitions, a short Huffman code is calculated from the LAV distribution, based on a 4-way partition of the LAV's in the case of many non-zero partitions, or a three-way partition in the case of a few non-zero partitions. This code is used to generate a "Dimensionality Map" that can be used at the transmitter and efficiently transmitted to the receiver. For the 4-way case, the number of $N_z$=number of zero LAV's, $N_{4d}$=number of 0<LAV≦3, $N_{2d}$=number of 3<LAV≦25, and $N_{1d}$=number of 25<LAV are calculated, and for the 3-way case, $N_z$ is omitted. This 2 to 4 element code is transmitted at a cost of 8–30 bits, depending on the data, to the receiver. Symbols with zero occurrences are not included in the codebook.

Calculating the Dimensionality Map

A dimensionality map is then transmitted to the receiver, using the code calculated above, where one of the four symbols z, 4d, 2d, or 1d is sent for each partition in the case of many non-zero partitions, or one of three 4d, 2d, or 1d, is sent in the case of few non-zero partitions. The number 150 that is used to determine "many" vs. "few" is selected because it is the average crossover point between k,l addressing cost and transmission of the entire map.

This "Dimensionality Map" is used to determine the way that the c(*) are encoded, both at the transmitter and receiver. In the case of few non-zero partitions, the "Dimensionality Map" is called the "Reduced Dimensionality Map", as the location of the non-zero partitions is explicitly transmitted, rather than determined implicitly from the position in the dimensionality map.

Transmitting the Codewords

The codewords, c(*), are transmitted last in the noiseless compression sequence. One of three encoding methods is used for each partition in which the LAV is non-zero, depending on the entry in the dimensionality map in for that partition. In cases where the LAV for the partition is known to be zero, either by omission in the reduced dimensionality map, or explicitly in the dimensionality map, the c(*)'s are not transmitted.

1d Coding

The 1d coding is a one-dimensional Huffman coding of the 16 c(*)'s in the partition, and is used when the 1d symbol appears in the dimensionality map. Each c(*) is separately encoded using a selected pre-generated Huffman codebook. The codebook selection (one of six) for each entire sub-band for 1d coding is made on the basis of which of the 6 1d codebooks provides the best compression. The information on codebook selection for 1d, 2d, and 4d are all transmitted after the dimensionality map, but before any of the c(*) data is transmitted.

2d Coding

The 2d coding is done on the partitions that have a 2d symbol in the dimensionality map. For these partitions are encoded as 8 pairs of 2 c(*)'s, using adjacent horizontal pairs to find an entry in one of six 2-dimensional Huffman codebooks. Again the best 2-d codebook is selected on a sub-band by sub-band basis, and the codebook selection is passed to the receiver as above.

4d Coding

The 4d coding is done on the partitions that have a 4d symbol in the dimensionality map. For these partitions, the c(*)'s are encoded as 4 groups of 4 elements each. Each of the 2×2 sub-squares of the partition is encoded as one codeword in a 4 dimensional Huffman codebook. The codebook selection is done as above.

Compression Results

The compression results from the above methods have the following properties: Totally vacant (in the perceptual sense) sub-bands are encoded using 1 bit, or a rate of 1/16384 bits/pixel (16384=128²). In sub-bands where only a few perceptually significant partitions exist, each is encoded with 10 bits for the location, approximately 2 bits for dimensionality, and a small number of bits for the c(*)'s. This allows for efficient encoding of a small part of any given subband where that part is perceptually important. In bands where more than about ⅛ of the band is encoded, all partitions are encoded, but: All-zero partitions are encoded at a rate of 1/16 bits/pixel, if all-zero partitions are common. Parts of the sub-band that have a very few non-zero, or all small values, are encoded with a 4 dimension codebook that provides a minimum of ¼ bits/pixel for all-zero sub-partitions. In addition, any residual correlation spread over the 2×2 squares is efficiently encoded. Parts of the sub-band with moderate activity are encoded at a minimum rate of ½ bits/pixel, and the residual correlation also taken care of by the codebook. Parts of the sub-band with very high activity are encoded with a coding method that has a minimum rate of 1 bit/pixel, but that also allows for maximum values as they may be required by the perceptual process, without requiring the use of $\log_2(\text{abs}(2c_{max})*2+1)$ bits for each element. The use of 6 codebooks for each dimensionality allows the coder to choose from a variety of probability/correlation combinations. While this result does not greatly increase the compression rate, on the average, it does greatly increase the effectiveness of the compression algorithm on the most difficult items. The use of a short (4 element) internally generated Huffman code for the dimensionality map allows effective and efficient transmission of the dimensionality map. As an example, in many higher sub-bands the only symbols needed are z and 4d. Given the locally calculated and easily transmitted codebook, for that case only 1 bit/map element is used, making the "side-information" cost only 1/16 bits/pixel.

Codebook Generation

This section describes the method we use to generate the codebook set for the Huffman compression of the c(*)'s. There are three sets (4d, 2d, and 1d) of six codebooks that must be predetermined.

The Huffman codebooks are generated from the probability distribution of the data that they encode, so the task is that of partitioning the data into 6 sets based on their statistics such that the Huffman codes are efficient. We do this in several steps: First, we partition the appropriate data (4d, 2d, or 1d) into six sets, via the Modified K-Means algorithm and the total frequency content, or on an image by image basis. Using the distribution for each set, we generate a Huffman codebook. Using that set of codebooks, we encode the entire training set, at each sub-band selecting the best of the six codebooks for each dimensionality, and saving the number of occurrences in each codebook slot for the selected codebook. Using the new set of distributions, generate a new Huffman codebook set. Repeat the process of the last two sentences until the exchange of sub-bands between codebooks becomes infrequent.

These steps are based on the following: Each time a different codebook selection is made, a new and better encoding has been selected. If a codebook change is not made, the average rate remains the same. Each time a new codebook is calculated, it fits the data that it is applied to better, and provides the same or better compression because it is calculated to fit the current, rather than the last iteration's data.

This codebook selection procedure is run on a training set of 107 images.

Codebook Effectiveness

The codebooks selected and trained on our training set have been tested on a 36 element set of test images that are different than the training images. The performance of the compression algorithm, including the codebooks, on the test images is equivalent to the performance on the training set.

We have imposed various mismatches deliberately, such as changing the quality offset (by ±5 or ÷10 dB), while using the codebook for zero offset. The compression results, while not as good as is possible for a properly generated codebook, are still close to that of the properly generated codebook for perceptual offsets within the +10 to −5 range.

There are $6*7^4$ elements in the 4d codebook set, $6*51^2$ in the 2d set, and $6*769$ in the 1d set, for a total codebook size of 34626 entries. This small codebook set suffices for the range of images from simple scenery with low contrast all the way to complex text or texture images.

Our preliminary tests of the invention demonstrate the interaction of the lowpass spectrum of images and the perceptual metric work together to reduce the amount of information that needs to be coded, including a significant reduction in the average percent of time in which at least one 4×4 block of a sub-band must be coded, and in the percent of each sub-band that is coded given that at least one 4×4 block is coded. These can be interpreted by thinking of sub-band (0,0) as a reduced resolution version of the image and the rest of the sub-bands as "detail" images at increasingly finer levels. Therefore band (0,0) has the greatest amount of perceivable information about the image, while the higher frequency bands contain perceivable information only where there is a certain type of detail. Smooth low detail areas require only one sub-band (although the value of the perceptual metric may be quite small at the point), while high detail areas, such as edges, require information from several sub-bands.

Figure 7:
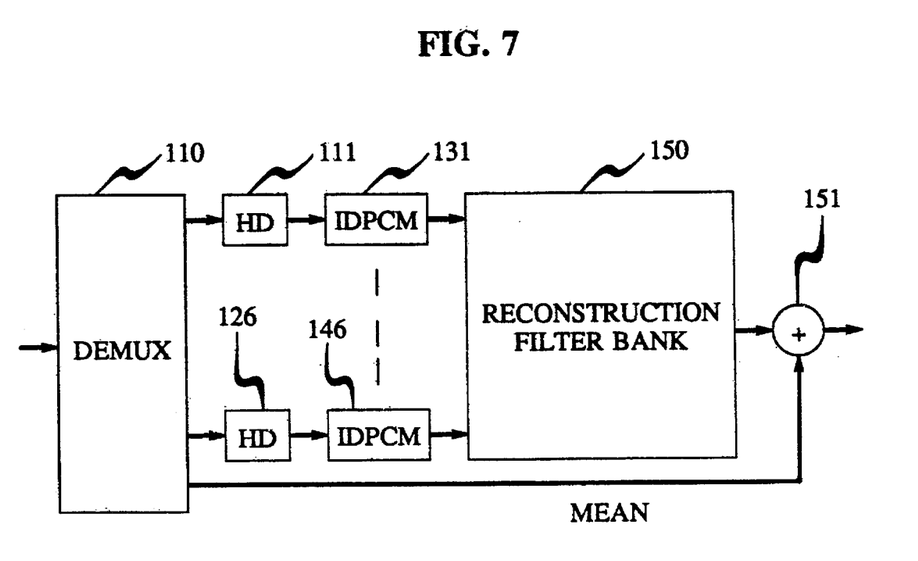
FIG. 7 is a block diagrammatic showing of one organization of the decoder 14 of FIG. 1.

In FIG. 7, there is shown the detailed implementation, according to our invention, of receiver 13 and decoder 14 of FIG. 1.

The arrangement of FIG. 7 simply reverses the encoding process. The receiver-decoder of FIG. 7 includes the demultiplexer 110, the Huffman decoders 111–126 for each of the individual 16 sub-bands, the inverse differential PCM processors (decoders) 131–146, the reconstruction filter bank 150, and the combiner circuit 151, which could be shown as a part of reconstruction filter bank 150.

Figure 10:
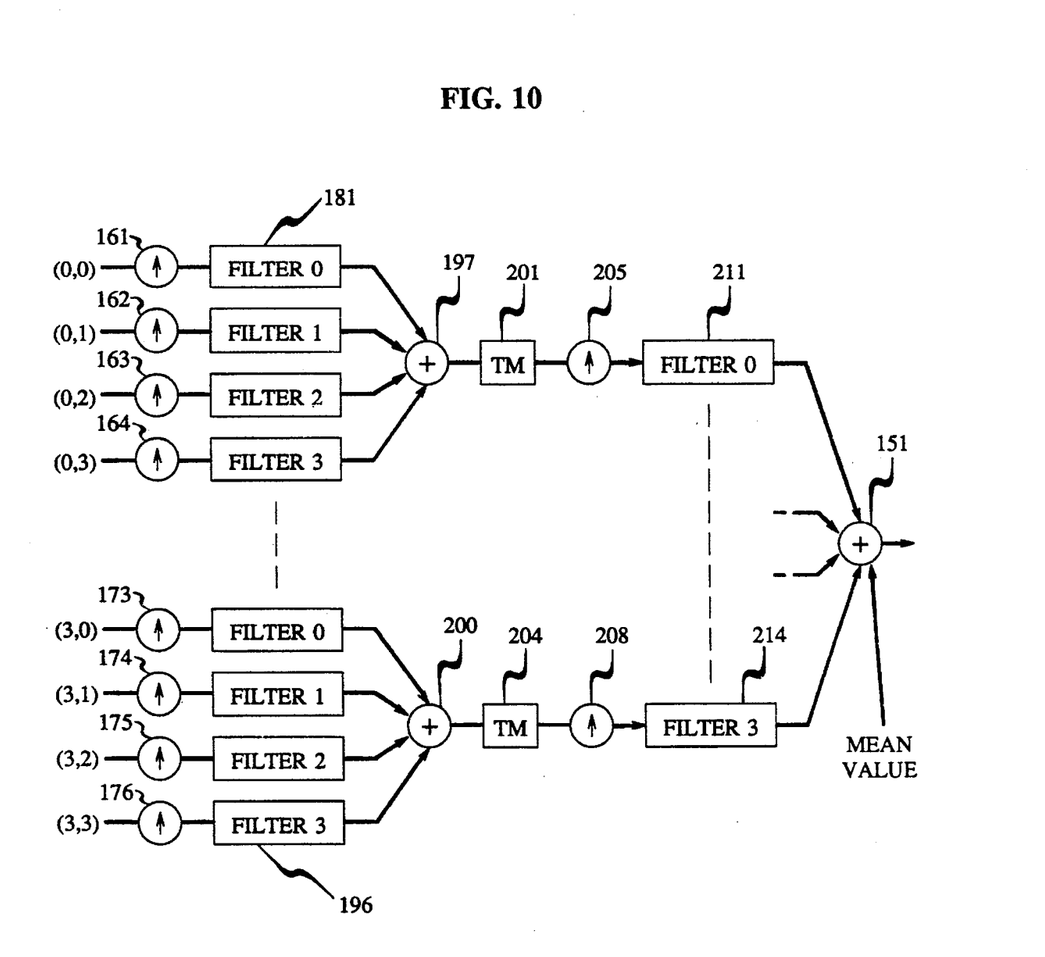
FIG. 10 shows a block diagram of the reconstruction filter bank of FIG. 7.

Reconstruction filter bank 150 is detailed in FIG. 11; and it will be seen that this figure provides the same type of apparatus, but operating to merge the sub-bands, as the apparatus of FIG. 4, with up-sampling replacing down-sampling.

Of course, the mean value that was removed in apparatus 121 of FIG. 2 was also transmitted or recorded and must be re-inserted in combiner 151 of FIG 5, 6 and 7.

Specifically, each of the sub-band passes through its respective up-sampling switch 161–176, where values are repeated from (4) times, through the respective of filters 181–196, through combiners 197–200, through transform memories 201–204, up-sampling switches 205–208, and filters 211–214 to combiner 151.

Finally, our tests demonstrate that the combination of multidimensional noiseless compression and the omission of coding of blocks that meet the perceptual metric provide a very powerful bitrate reduction scheme. The linear codebook is used only for portions of the low frequency sub-bands, while the 2D and 4D codebooks, with their lower bitrate, are used everywhere else. This scheme allows extremely fine quantization of the data where it is necessary, without the large bitrate penalty where it is not. The reproduction of the two-dimensional information is of surprisingly good quality; and the algorithms are capable of imperceptible degradation.

It should be apparent that various modifications of the inventions are possible within the scope of the above-described principles of operation. For example, the adjustments for frequency and contrast sensitivity could be separated more completely than they are in the base sensitivity and brightness adjustment processes of FIG. 5.

We claim:

1. A circuit implemented method for encoding an input signal representing at least a portion of an image, the method comprising:

(a) filtering the input signal with a circuit implemented filter to obtain a first set of spectral functions; and (b) based on a set of at least one perceptual threshold signal, generating a quantized output signal with a quantizer, the quantized output signal being representative of at least one of the first set of spectral functions, each said perceptual threshold signal representing a measure of human visual sensitivity to distortion in the first set of spectral functions, the perceptual threshold signal being generated in accordance with a perceptual model, the perceptual model being responsive to:

(i) at least one of the first set of spectral functions; and (ii) a second set of spectral functions representing a plurality of other images.

2. The method of claim 1 wherein the generation of each said perceptual threshold signal further comprises:

(a) based upon a set of properties, estimating a set of values; and (b) combining said set of values resulting in a perceptual output.

3. The method of claim 2 wherein said step of combining comprises multiplying together each said value in said set of values.

4. The method of claim 2 wherein said set of properties are frequency response, contrast sensitivity, and texture masking.

5. The method of claim 1 wherein the step of filtering further comprises:
   (a) horizontally filtering the input signal resulting in a horizontally filtered input signal; and
   (b) vertically filtering the horizontally filtered input signal resulting in the first set of spectral functions.

6. A circuit implemented method for encoding a series of time ordered images, at least a portion of each said time ordered image being represented by an input signal, the method comprising, for each said input signal, the steps of:
   (a) filtering the input signal with a circuit implemented filter to obtain a first set of spectral functions; and
   (b) based on a set of at least one perceptual threshold signal, generating a quantized output signal with a quantizer, the quantized output signal being representative of at least one of the first set of spectral functions, each said perceptual threshold signal representing a measure of human visual sensitivity to distortion in the first set of spectral functions, the perceptual threshold signal being generated in accordance with it perceptual model, the perceptual model being responsive to:
      (i) at least one of the first set of spectral functions; and
      (ii) a second set of spectral functions representing a plurality of other images.

7. The method of claim 6 wherein the generation of each said perceptual threshold signal further comprises:
   (a) based upon a set of properties, estimating a set of values; and
   (b) combining said set of values resulting in a perceptual output.

8. The method of claim 7 wherein said step of combining comprises multiplying together each said value in said set of values.

9. The method of claim 7 wherein said set of properties are frequency response, contrast sensitivity, and texture masking.

10. The method of claim 6 wherein the step of filtering further comprises:
    (a) horizontally filtering the input signal resulting in a horizontally filtered input signal; and
    (b) vertically filtering the horizontally filtered input signal resulting in the first set of spectral functions.

11. A digital storage device for storing digital information, said digital information representative of a plurality of images, at least a portion of each said image being represented by an input signal, each said input signal being represented on said digital storage device according to the steps of:
    (a) filtering the input signal with a circuit implemented filter to obtain a first set of spectral functions; and
    (b) based on a set of at least one perceptual threshold signal, generating a quantized output signal with a quantizer, the quantized output signal being representative of at least one of the first set of spectral functions, each said perceptual threshold signal representing a measure of human visual sensitivity to distortion in the first set of spectral functions, the perceptual threshold signal being generated in accordance with a perceptual model, the perceptual model being responsive to:
       (i) at least one of the first set of spectral functions; and
       (ii) a second set of spectral functions representing a plurality of other images.

12. The device of claim 11 wherein said digital storage device is a compact disc.

13. The device of claim 11 wherein said digital storage device is a magnetic tape.

14. The device of claim 11 wherein said digital storage device is an integrated circuit.

15. The device of claim 11 wherein said digital storage device comprises a first means responsive to magnetic stimuli and a second means responsive to optical stimuli.

* * * * *